United States Patent [19]

Gonnello

[11] 4,121,367
[45] Oct. 24, 1978

[54] AUTOMATIC SIGNAL AND HOOK-SETTING ICE FISHING EQUIPMENT

[76] Inventor: Lawrence Joseph Gonnello, 27 Lake Dr., Belchertown, Mass. 01007

[21] Appl. No.: 780,588

[22] Filed: Mar. 24, 1977

[51] Int. Cl.² .................... A01K 91/06; A01K 97/12
[52] U.S. Cl. ........................................................ 43/16
[58] Field of Search ............................ 43/4, 15, 16, 17

[56] References Cited

U.S. PATENT DOCUMENTS

| | | | |
|---|---|---|---|
| 2,114,529 | 4/1938 | Goodhue | 43/17 |
| 2,654,176 | 10/1953 | Kachelski | 43/17 |
| 2,786,294 | 3/1957 | Whitacre | 43/17 |
| 2,955,374 | 10/1960 | Matzo et al. | 43/16 |

Primary Examiner—Ronald E. Suter
Attorney, Agent, or Firm—Ross, Ross & Flavin

[57] ABSTRACT

A combination fishing equipment - signal device for use in fishing through the ice including means for paying out a line without such appreciable force being required as would scare off a fish which starts to nibble at the line and for suddenly bringing pay out to an abrupt halt so that continued nibbling will cause the line and the other equipment supported by a reel supporting rod extended through the ice to rotate transversely relative to that reel supporting rod to the point in its arc whereat the line and other supported equipment is suddenly jerked upwardly in a fish-snaring movement, allowing the catching of the fish on the line, and the signal to be simultaneously raised upwardly into operative position.

1 Claim, 8 Drawing Figures

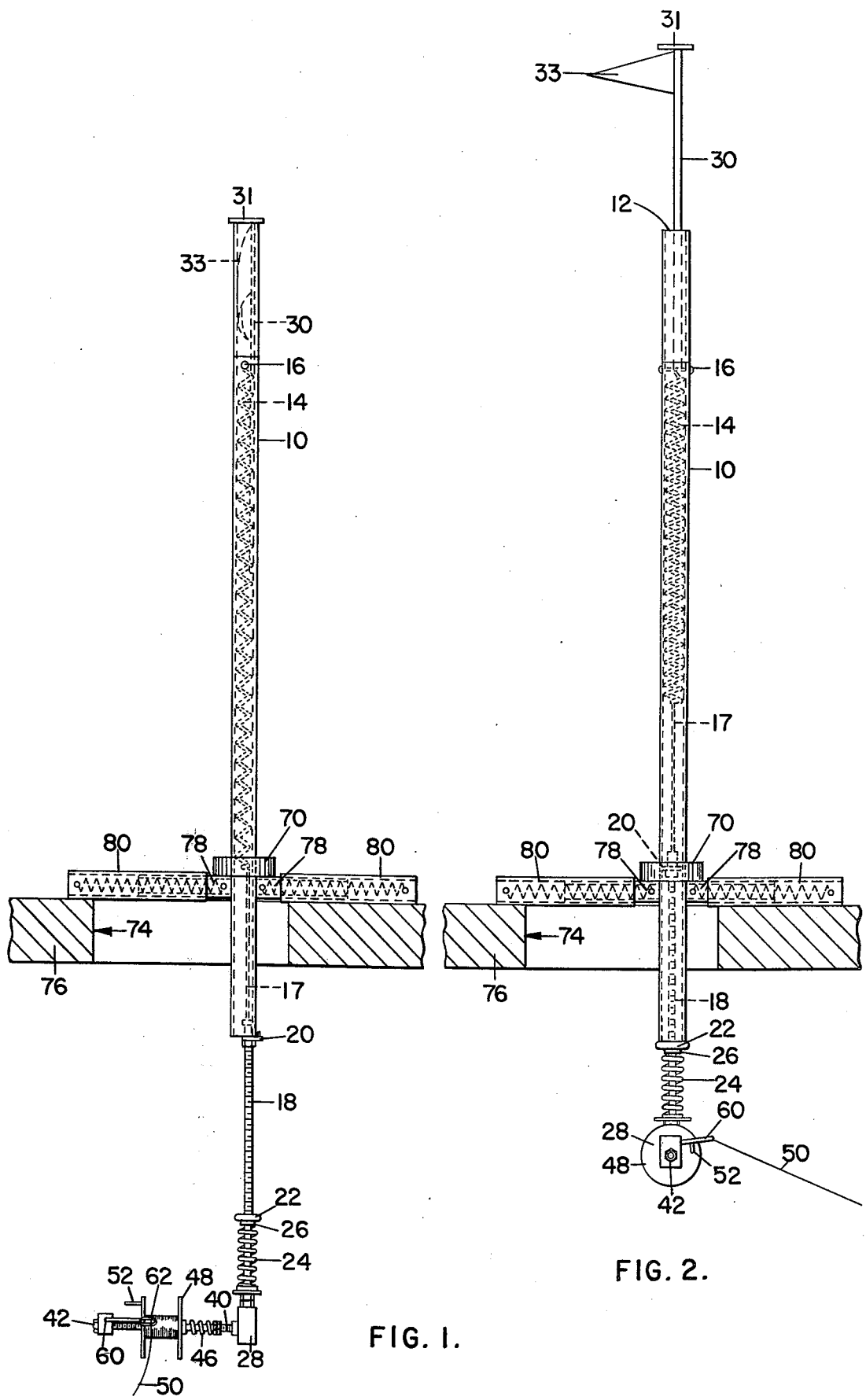

AUTOMATIC SIGNAL AND HOOK-SETTING ICE FISHING EQUIPMENT

This invention relates to a combination fishing equipment-signal device for ice fishing and has for a primary object to provide a device of this general character wherein a fish line reel is suspended through an ice hole and below the water surface and from which reel a line may be paid out through the nibbling of a fish to the point where continued pay out is brought to a sudden and abrupt halt with a sudden jerking of the line vertically upwardly, hopefully catching the fish therewith, while simultaneously signalling the fact upwardly of the ice for the obvious purpose of notifying the fisherman of the possibility of a fish having been caught.

I am aware of the following U.S. patents directed to signalling apparatus as employed in ice fishing:
- U.S. Pat. No. 2,448,346 of Aug. 31, 1948 — R. N. Baugh et al
- U.S. Pat. No. 2,451,693 of Oct. 19, 1948 — K. D. Richards
- U.S. Pat. No. 2,502,231 of Mar. 28, 1950 — J. A. Oberg
- U.S. Pat. No. 2,506,092 of May 2, 1950 — K. W. Lyons
- U.S. Pat. No. 2,565,379 of Aug. 21, 1951 — F. H. Laurila
- U.S. Pat. No. 2,569,946 of Oct. 2, 1951 — E. H. Olesen et al
- U.S. Pat. No. 2,598,778 of June 3, 1952 — W. Fred None of these references teaches a device which allows pay out only to a certain predetermined extent and which, upon attaining such pay out, precludes further reel rotation in a manner resulting in a rotation along a horizontal plane (perpendicular to the main vertical longitudinal axis of the reel supporting member) and about that longitudinal axis, eventually arriving at a point where eccentrically arranged means slips out of engagement with the reel supporting member so as to cause the reel and line to be suddenly jerked upwardly in a fish snaring movement as the signal is likewise projected upwardly in signalling direction.

No reference provides this combination of features.

In the drawings:

FIG. 1 is a side elevational view of the combination ice fishing equipment-signal device showing same in its operative position supported through a hole in the ice, the signal member and reel being shown in their set positions;

FIG. 2 is a side elevational view of the FIG. 1 components showing same in their released positions;

Figure 3:
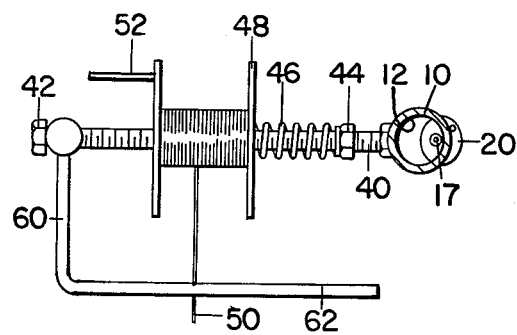
FIG. 3 is an enlarged sectional view on line 3—3 of FIG. 1.
Figure 4:
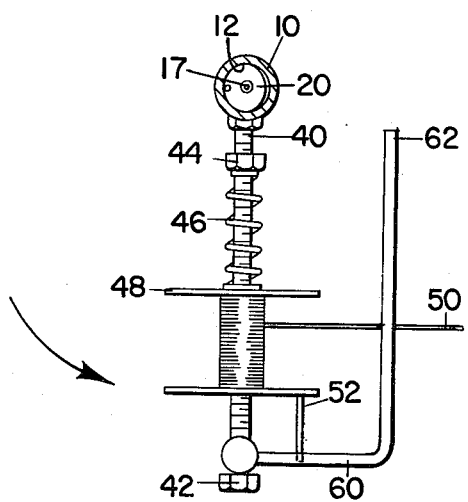
FIG. 4 is an enlarged sectional view on line 4—4 of FIG. 2.
Figure 5:
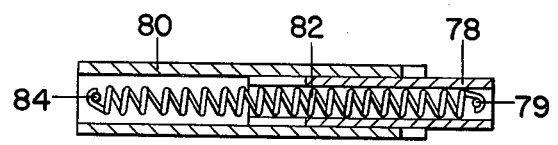
FIG. 5 is an enlarged sectional view of one of the feet of the tripod of the invention and its respective extension in the extended supporting positions.

Referring to the drawings, the combination ice fishing equipment-signal device, according to the illustrated exemplary embodiment of the invention, comprises an elongated tubular reel supporting member 10 preferably constructed of metal which may be suitably treated to render it water-resistant and provided centrally with a passage 12 extending longitudinally therethrough.

A spring 14 is loosely receivable within passage 12 and is pinned at its upper extremity relative to the upper terminal of the reel supporting member 10 as by a transversely-extending diametrically-disposed pin 16 through opposite sides of the wall thereof.

The lower end of spring 14 is suitably connected to the upper terminal of a wire 17, to the lower terminal of which the upper terminal of a depending rod 18 is secured. Along the length of the rod may be disposed, each in a circumscribing manner, an upper lock stop 20 which may be eccentrically arranged relative thereto as well as fixed with respect thereto as by a weldment, set screw or equivalent system, an intermediate abutment collar 22 spaced therebelow and seated loosely on the upper end of a lower spring 24, a washer 26 upon which the spring may loosely seat, and a lowermost terminal 28 fixed to the lowermost extremity thereof as by a pin or weldment or equivalent system.

The upper lock stop 20 by virtue of its eccentric relationship to rod 18 may be brought into engagement with one side of the lowermost edge of reel supporting member 10 in a manner such that, as rod 18 may be operationally rotated relative to the reel supporting member 10 it is enduced suddenly to ride off of its seat on member 10, and under the enducement of spring 14 rod 18 is then abruptly driven upwardly in a vertical direction.

To first complete the description of those components located within reel supporting member 10, the connection between the lower extremity of spring 14 and the upper extremity of wire 17 also serves as a connection for the lower extremity of a flag staff 30, a leaflike metallic member which is sleeved within spring 14 and, as will appear, is of a length such as to allow an upper end to extend about flush with the upper extremity of the reel supporting member in first non-signalling (FIG. 1) position and quite extensively thereabove in a second signalling (FIG. 2) position.

At the upper end of flag staff 30, a buttonlike eye protector 31 is provided so as to protect the eye of a fisherman who may be in an unfavorable position relative to the device when sprung.

Also adjacent the outer end of flag staff 30 is a flag 33 which is curled in nested position in FIG. 1 and is unfurled when sprung to the FIG. 2 position so as to be clearly visible.

Projecting outwardly from terminal 28 and perpendicular thereto is a threaded guide 40, the inboard end of which guide may be threadedly engaged in a suitable threaded opening in the terminal and the outboard end of which guide may be provided with a stop 42 pinned thereto.

Along the guide an adjusting nut 44 is threadedly engaged and may be adjusted in inboard and outboard directions so as to drive a spring 46 sleeved upon the guide in a more compressed state (when the nut is adjusted in outboard direction) and a more relaxed state (when the nut is adjusted in inboard direction).

A reel 48 is so configured as to allow a central opening therethrough to ride upon the threads of the guide so as to be movable therealong as a line 50 wound upon the reel is wound upon the reel or paid out therefrom.

An outwardly projecting stop 52 extends outwardly from the outboard side of the reel so as to be brought into confrontation with the stem 60 of a slotted guide 62 which is secured to guide 40 and through the slot of which the line may be passed so as to preclude unwanted entanglement between reel and line during operational use.

As the line is paid out to accommodate to the demands of a nibbling fish, the reel is caused to move in outboard direction as it also rotates upon the guide until such moment when the stop on the reel is brought into confrontation with stem 60 of the slotted guide causing a cessation of further pay out of line by the reel so that, if a fish is nibbling at the hook, the taut line will then allow only a sidewise rotative movement of the guide and its supported components about the main axis of reel supporting member 10 to that point where upper lock stop 20 will be next rotated relative to the lower end of the wall of the reel supporting member 10 in sufficient degree so as to allow its slippage therefrom by virtue of its eccentric relationship therewith past the lower end and, due to the consequent release of spring 14 to enduce a sudden upward thrust of signal 30 into signalling position but more importantly a sudden upward jerk upon rod 18, guide 40, reel 48 and of course the locked taut line 50 so as hopefully to hook the fish.

To support the arrangement relative to the ice, a tripod like mechanism may be adjustably secured to reel supporting member 10 and will include an annular collar 70 which may be sleeved upon the outside wall of member 10 and secured thereto as by a pin or the like at any desired position along the length thereof so as to allow the extension of the member 10 through the hole 74 in the ice 76 to any desired depth.

Projecting radially outwardly from below the collar 70 in equispaced arrangement is a trio of feet 78, each in the form of a hollow tubular member and fixed to the collar as by a pin 79 or other suitable means.

Telescopically engaged with each foot 78 so as to be receivable over the outboard free end thereof is a foot extension 80.

In each instance foot 78 and its respective foot extension 80 are interconnected by a spring 82 connected at the inboard end of the foot by pin 79 and at the outboard end of the foot extension by a pin 84.

Figure 6:
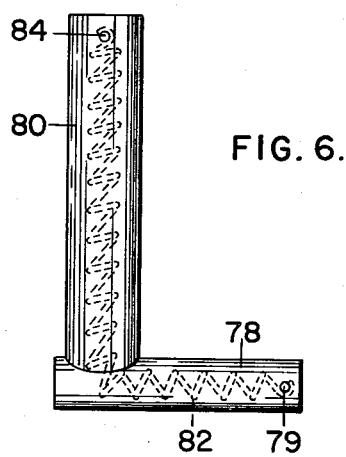
FIG. 6 is an enlarged sectional view of one of the feet of the tripod of the invention and its respective extension in the retracted storing position.
Figure 7:
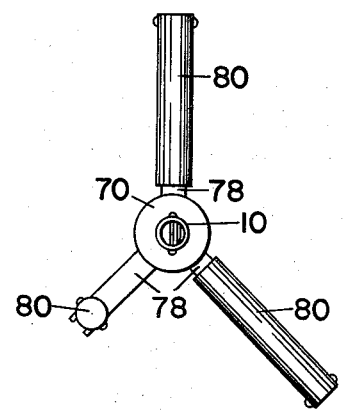
FIG. 7 is a small scale plan view of the ring collar and feet and extensions of the tripod.
Figure 8:
FIG. 8 is an enlarged side elevational view of one of the feet of the tripod of the invention.

When it is desired to bring the foot extensions into storage positions, each is withdrawn from its telescoping position with a respective foot and is brought into a right angular position relative thereto so as to sit upon the outer wall of its foot in a vertical position, as shown in FIG. 6, in which position it will be extendable in a position roughly parallel to the reel supporting rod.

I claim:
1. In a combination fishing equipment-signal device for ice fishing, the combination of:
   a vertically disposed reel supporting tube for extension into the ice hole,
   an adjustable bridging means for resting upon the ice surface and bridging the ice hole and supporting the upper portion of the reel supporting tube upwardly of the ice and the lower portion of the reel supporting tube downwardly of the ice,
   a rod within the reel supporting tube and extending downwardly therefrom,
   a signal means within the reel supporting tube,
   the rod and signal means each being movable between a lower set position and an upper released position relative to the reel supporting tube,
   spring means within the reel supporting tube and extending between the rod and the signal means,
   a stop eccentrically fixed to the rod and selectively engageable with the reel supporting tube,
   a threaded guide projecting radially outwardly of the rod at the lower end thereof,
   a line carrying reel rotatably mounted upon the threaded guide,
   spring means on the threaded guide and bearing on the reel for moving the reel along the threaded guide in an outboard direction as the line is paid out responsive to fish nibbling,
   a stop means for precluding reel outboard movement and line pay out beyond a predetermined limit and for effecting horizontal rotative movement of the guide and reel and rod in a plane about the axis of the reel supporting tube for moving the eccentric stop means out of engagement with the reel supporting tube,
   whereby the signal means and rod are abruptly actuated upwardly from the lower set position to the upper released position.

* * * * *